(12) United States Patent
Shin et al.

(10) Patent No.: US 11,908,464 B2
(45) Date of Patent: Feb. 20, 2024

(54) ELECTRONIC DEVICE AND METHOD FOR CONTROLLING SAME

(71) Applicant: Samsung Electronics Co., Ltd., Suwon-si (KR)

(72) Inventors: Jaesun Shin, Suwon-si (KR); Joonrae Cho, Suwon-si (KR); Jeongman Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 17/309,363

(22) PCT Filed: Nov. 25, 2019

(86) PCT No.: PCT/KR2019/016233
§ 371 (c)(1),
(2) Date: May 21, 2021

(87) PCT Pub. No.: WO2020/130383
PCT Pub. Date: Jun. 25, 2020

(65) Prior Publication Data
US 2022/0028377 A1    Jan. 27, 2022

(30) Foreign Application Priority Data
Dec. 19, 2018 (KR) .................... 10-2018-0165549

(51) Int. Cl.
*G10L 15/20* (2006.01)
*G10L 15/22* (2006.01)
(Continued)

(52) U.S. Cl.
CPC ............. *G10L 15/20* (2013.01); *G10L 15/22* (2013.01); *G10L 21/0216* (2013.01); *H04R 1/326* (2013.01); *G10L 2021/02166* (2013.01)

(58) Field of Classification Search
CPC ....... G10L 15/20; G10L 15/22; G10L 21/0216; G10L 2021/02166; G10L 21/0208;
(Continued)

(56) References Cited

U.S. PATENT DOCUMENTS 4,401,852 A * 8/1983 Noso .................. B60R 16/0373
704/275
6,594,630 B1 * 7/2003 Zlokarnik .............. G10L 15/26
704/E15.045
(Continued)

FOREIGN PATENT DOCUMENTS

EP      1217608 B1    1/2005
JP      5022461 B2    9/2012
(Continued)

OTHER PUBLICATIONS

International Search Report and Written Opinion of the International Searching Authority in connection with International Application No. PCT/KR2019/016233 dated Mar. 9, 2020, 11 pages.
(Continued)

*Primary Examiner* — Xu Mei (57) ABSTRACT

An electronic device and a method for controlling same are provided. The present electronic device comprises: a communication unit; and a processor configured to receive multiple audio signals via the communication unit, the multiple audio signals being acquired by multiple external electronic devices which have microphones, respectively, and which are positioned at different places, via microphones thereof, the processor being configured to determine at least one audio signal including a user voice uttered by a user among the multiple audio signals and to perform voice recognition regarding an audio signal acquired from the determined audio signals on the basis of the intensity of the determined audio signals.

13 Claims, 7 Drawing Sheets

(51) Int. Cl.
*G10L 21/0216* (2013.01)
*H04R 1/32* (2006.01)

(58) Field of Classification Search
CPC .............. H04R 1/326; H04R 2227/005; H04R 2227/009; H04R 2420/07; H04R 1/1083; Y02E 10/50; G06F 3/16; H02S 99/00
USPC .......................... 381/110; 704/246, 251, 275
See application file for complete search history.

(56) References Cited

U.S. PATENT DOCUMENTS

| | | | |
|---|---|---|---|
| 8,666,750 B2* | 3/2014 | Buck | G10L 15/28 |
| | | | 704/270.1 |
| 8,792,648 B2 | 7/2014 | Kim et al. | |
| 8,831,957 B2* | 9/2014 | Taubman | G10L 15/30 |
| | | | 379/88.04 |
| 9,443,516 B2* | 9/2016 | Katuri | G10L 15/28 |
| 9,741,360 B1 | 8/2017 | Li et al. | |
| 9,922,646 B1* | 3/2018 | Blanksteen | G06F 3/167 |
| 10,121,473 B2* | 11/2018 | Bargetzi | G10L 15/22 |
| 10,371,568 B2 | 8/2019 | Shin et al. | |
| 10,429,817 B2* | 10/2019 | Katole | G10L 15/22 |
| 10,593,326 B2* | 3/2020 | Teasley | G10L 15/22 |
| 10,861,484 B2* | 12/2020 | Steele | H04R 1/1016 |
| 11,289,081 B2* | 3/2022 | Asada | H04R 1/04 |
| 2003/0018479 A1* | 1/2003 | Oh | G10L 21/0272 |
| | | | 704/E19.009 |
| 2010/0033585 A1* | 2/2010 | Ye | H04N 7/15 |
| | | | 348/E5.042 |
| 2014/0337029 A1* | 11/2014 | Talwar | G10L 15/083 |
| | | | 704/251 |
| 2015/0213797 A1 | 7/2015 | Wang et al. | |
| 2017/0125037 A1* | 5/2017 | Shin | G10L 15/20 |
| 2019/0214011 A1 | 7/2019 | Shin et al. | |

FOREIGN PATENT DOCUMENTS

| | | |
|---|---|---|
| JP | 2017-090276 A | 5/2017 |
| KR | 10-0892095 B1 | 4/2009 |
| KR | 10-1046022 B1 | 7/2011 |
| KR | 10-2015-0032731 A | 3/2015 |
| KR | 10-1813593 B1 | 1/2018 |
| KR | 10-2018-0041355 A | 4/2018 |
| KR | 10-1882309 B1 | 7/2018 |

OTHER PUBLICATIONS

Request for the Submission of an Opinion dated Aug. 29, 2023, in connection with Korean Application No. 10-2018-0165549, 10 pages.

* cited by examiner

ELECTRONIC DEVICE AND METHOD FOR CONTROLLING SAME

CROSS-REFERENCE TO RELATED APPLICATIONS

This application is a 371 of International Application No. PCT/KR2019/016233, filed Nov. 25, 2019, which claims priority to Korean Patent Application No. 10-2018-0165549, filed Dec. 19, 2018, the disclosures of which are herein incorporated by reference in their entirety.

BACKGROUND

1. Field

This disclosure relates to an electronic device and a method for controlling same. More particularly, this disclosure relates to an electronic device for receiving an audio signal from an external electronic device while communicating with the external electronic device.

2. Description of Related Art

In accordance with the development of a speech recognition technology, an electronic device equipped with a speech recognition technology has been increasing. An electronic device equipped with a speech recognition technology may receive a speech command uttered by a user as an input and may operate to execute a function according to the speech of the user.

An electronic device equipped with a speech recognition technology to receive a speech command of a user may include a microphone, and may receive a user's speech through a microphone. However, as a distance between the microphone and the user increases, a recognition rate for the user's speech may become lower.

In order to improve the recognition rate for the user speech of the electronic device equipped with the speech recognition technology, a method of arranging a plurality of microphones in the electronic device may be considered, but in this case, an interference phenomenon may occur among the plurality of microphones.

A method of installing a plurality of microphones connected to the electronic device at a remote distance may be considered, but in this case, there may be a drawback in that the plurality of microphones need to be arranged near a power supply terminal, since the microphone needs to always maintain a power on state. In order to overcome this problem, a plurality of microphones connected to the electronic device may operate using a battery such as a dry battery or a rechargeable battery, but in this case, there may be a drawback in that the battery needs to be replaced or charged periodically.

SUMMARY

It is an object of the disclosure to provide an electronic device to receive a user speech signal using an external electronic device which includes a microphone and converts external energy into electrical energy through energy harvesting and a method for controlling thereof.

According to an embodiment, an electronic device includes a communicator and a processor configured to receive a plurality of audio signals through the communicator, the plurality of audio signals being obtained by a plurality of external electronic devices having microphones, respectively, and which are located at different places, via microphones, determine at least one audio signal including a user speech uttered by a user, among the plurality of audio signals, and perform speech recognition regarding an audio signal obtained from the determined audio signals based on an intensity of the determined audio signals.

The processor may determine at least one audio signal including a user speech uttered by the user, from among the plurality of audio signals, based on a signal pattern of the plurality of audio signals.

The processor may determine an audio signal having similar signal patterns, among the plurality of audio signals, as an audio signal including a user speech uttered by the user.

The processor may transmit, to an external server through the communicator, an audio signal that is greater than or equal to a preset magnitude, among the plurality of audio signals, and determine at least one audio signal including a user speech uttered by the user among the plurality of audio signals based on the information received from the external server.

The processor may perform speech recognition for an audio signal having greatest intensity among the determined audio.

The processor may remove noise from an audio signal obtained based on the intensity of the determined audio signal and perform speech recognition for the audio signal from which the noise is removed.

The processor may determine a location of the user based on a location of an external electronic device which transmits an audio signal for which the speech recognition is performed among the plurality of external electronic devices, and provide a service according to the speech recognition based on the determined location of the user.

The plurality of external electronic devices may convert an external energy into an electrical energy through energy harvesting and may supply power to the plurality of external electronic devices using the electrical energy.

According to an embodiment, a method for controlling an electronic device includes receiving a plurality of audio signals, the plurality of audio signals being obtained by a plurality of external electronic devices having microphones, respectively, and which are located at different places, via microphones, determining at least one audio signal including a user speech uttered by a user, among the plurality of audio signals, and performing speech recognition regarding an audio signal obtained from the determined audio signals based on an intensity of the determined audio signals.

The determining the audio signal may include determining at least one audio signal including a user speech uttered by the user, from among the plurality of audio signals, based on a signal pattern of the plurality of audio signals.

The determining the audio signal may include determining an audio signal having similar signal patterns, among the plurality of audio signals, as an audio signal including a user speech uttered by the user.

The determining the audio signal may include transmitting, to an external server, an audio signal that is greater than or equal to a preset magnitude, among the plurality of audio signals and determining at least one audio signal including a user speech uttered by the user among the plurality of audio signals based on the information received from the external server.

The performing the speech recognition may include performing speech recognition for an audio signal having greatest intensity among the determined audio.

The performing the speech recognition may include removing noise from an audio signal obtained based on the intensity of the determined audio signal and performing speech recognition for the audio signal from which the noise is removed.

The method may further include determining a location of the user based on a location of an external electronic device which transmits an audio signal for which the speech recognition is performed among the plurality of external electronic devices and providing a service according to the speech recognition result based on the determined location of the user.

The plurality of external electronic devices may convert external energy into electrical energy, and may provide power to the plurality of external electronic devices using the electrical energy.

As described above, by receiving a user's speech signal through communication with an external electronic device including a microphone and converting external energy into electrical energy through energy harvesting, the electronic device may receive a user speech signal even when the user is located at a remote distance, without limitation of a space. In that the external electronic device may convert external energy into electrical energy and receive a user speech using the converted electrical energy, the external electronic device may be installed conveniently for the user without restrictions such as an outlet. Accordingly, the user may transmit a speech command to the electronic device without limitation of the distance by installing the external electronic device at a desired place without restriction of the space.

DETAILED DESCRIPTION

Before describing the disclosure in detail, an overview for understanding the disclosure and drawings will be provided.

The terms used in the present specification and the claims are general terms identified in consideration of the functions of the various embodiments of the disclosure. However, these terms may vary depending on intent, technical interpretation, emergence of new technologies, and the like of those skilled in the related art. Some terms may be selected by an applicant arbitrarily, and the meaning thereof will be described in the detailed description. Unless there is a specific definition of a term, the term may be construed based on the overall contents and technological understanding of those skilled in the related art.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

As used herein, the terms "first," "second," or the like may identify corresponding components, and are used to distinguish a component from another without limiting the components.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part," and so on may refer, for example, to an element that performs at least one function or operation, and such element may be implemented as hardware or software, or a combination of hardware and software. Further, except for when each of a plurality of "modules," "units," "parts," and the like must be realized in an individual hardware, the components may be integrated in at least one module or chip and be realized in at least one processor executing software.

In the disclosure, "at least one of a, b, or c" may represent only a, b, c, both a and b, both a and c, both b and c, all of a, b, and c, and modification thereof.

Hereinafter, non-limiting example embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification.

An application according to embodiments may represent an operating system (OS) for computer or software executed on the mobile OS and used by a user. For example, the application may include a web browser, a camera application, a mobile payment application (or e-billing application, a settlement application), a photo album application, a word processor, a spread sheet, a contacts application, a calendar application, a memo application, an alarm application, a social network system (SNS) application, a call application, a game store, a game application, a chatting application, a map application, a music player, a video player, or the like.

The application according to embodiments may refer to software executed in an electronic device or an external electronic device connected to the electronic device by wire or wirelessly (e.g., a wearable device, a server, etc.).

An electronic device according to various embodiments may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer 3 (MP3) player, a mobile medical device, a camera, or a wearable device. According to various embodiments, the wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); or a bio-implantable circuit.

In some embodiments, the electronic device may be a home appliance. The home appliance may include, for example, at least one of a television, a digital video disc (DVD) player, an audio, a refrigerator, an air conditioner, a cleaner, an oven, an electronic range, a washing machine, an air cleaner, a set-top box, a home automation control panel, a security control panel, a TV box (e.g., SAMSUNG Home-Sync™, APPLE TV™, or GOOGLE TV™), game console (e.g., Xbox™, PlayStation™), e-dictionary, an electronic key, a camcorder, or a-frame.

In other embodiments, the electronic device may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), a navigation system, a global navigation satellite system (GNSS), an event data recorder (EDR), a flight data recorder (FDR), an automotive infotainment devices, a marine electronic equipment (e.g., marine navigation devices, gyro compasses, etc.), avionics, a security device, a car head unit, industrial or domestic robots, a drone, an automated teller machine (ATM), a point of sale (POS) of a store, or an Internet of Things (IoT) device (e.g., light bulbs, sensors, sprinkler devices, fire alarms, thermostats, street lights, toasters, exercise equipment, hot water tanks, heater, boiler, etc.).

According to various embodiments, the electronic device may be implemented as a part of furniture or building/structure, an electronic board, an electronic signature receiving device, a projector, any of various measuring devices (e.g., water, electricity, gas, or electromagnetic wave measuring devices, or the like), or the like. In various embodiments, the electronic device may be one or more of the various devices described above. The electronic device according to an embodiment may be a flexible electronic device. The electronic device is not limited to the devices described above, and may include a new electronic device according to technology development.

Various embodiments of the disclosure will be described in detail with reference to drawings.

Figure 1:
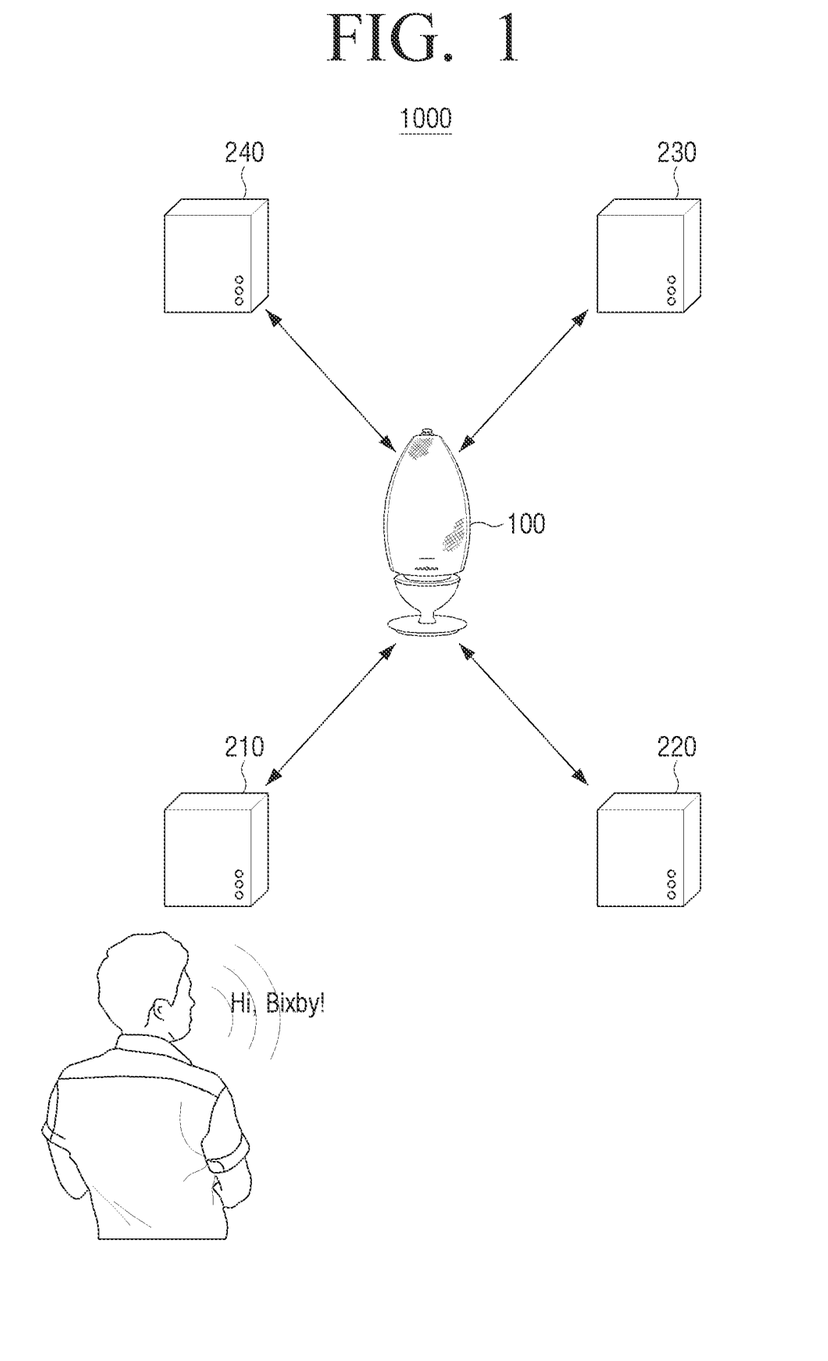
FIG. 1 is a diagram illustrating a system including an external electronic device and an electronic device according to various embodiments.

FIG. 1 is a diagram illustrating a system including an external electronic device and an electronic device according to various embodiments.

As illustrated in FIG. 1, a system 1000 may include an electronic device 100 and external electronic devices 210 to 240.

The electronic device 100 and the external electronic devices 210 to 240 may be located at different spaces. For example, the electronic device 100 may be located in a living room, the external electronic device 210 in room 1, the external electronic device 220 in room 2, the external electronic device 230 in room 3, and the external electronic device 240 in room 4.

The electronic device 100 may be connected to each other through a network and external electronic devices 210 to 240 existing in different spaces. For example, the electronic device 100 and the external electronic devices 210 to 240 may communicate by a device-to-device (D2D) communication method using various communication networks. Alternatively, the electronic device 100 may communicate with the external electronic devices 210 to 240 via a server (not shown). In this case, the electronic device 100 and the external electronic devices 210 to 240 may communicate with a server (not shown) through a gateway (not shown). In this manner, the electronic device 100 may transmit and receive various data with the external electronic devices 210 to 240.

The electronic device 100 may receive an audio signal from external electronic devices 210-240 located at different locations. The audio signal may be a signal including sound collected by the external electronic devices 210 to 240 and may include a user speech signal including a user speech or an audio signal including ambient noise, music, or the like. The noise such as ambient noise may be included in the user speech signal including the user speech.

In order to transmit an audio signal to the electronic device 100, the external electronic devices 210 to 240 may include a microphone to obtain sound around the external electronic devices 210 to 240. The external electronic devices 210 to 240 may convert the obtained sound into an audio signal. The external electronic devices 210 to 240 may transmit a plurality of audio signals obtained through the microphone to the electronic device 100.

The plurality of external electronic devices 210 to 240 may obtain external energy through energy harvesting, convert the external energy into electrical energy, and may supply power to the plurality of external electronic devices 210 to 240 using the converted electrical energy. For example, the external electronic devices 210 to 240 may convert solar energy into electrical energy through energy harvesting, obtain sound around the external electronic devices 210 to 240 using the converted electrical energy, and transmit the sound to the electronic device 100.

The electronic device 100 may determine at least one audio signal including a user speech uttered by a user among the audio signals received from the external electronic devices 210 to 240. The electronic device 100 may select an audio signal to perform speech recognition among at least one audio signal including a user speech.

As illustrated in FIG. 1, if the user utters "Hi, Bixby", the external electronic devices 210 and 220 close to the user may receive the user speech. In this case, the electronic device 100 may identify that a user speech signal is included in the audio signal received from the external electronic devices 210 and 220 among the audio signals received from the external electronic devices 210 and 220, and may select an audio signal for speech recognition among the plurality of audio signals received from the external electronic devices 210 and 220. The electronic device 100 may perform speech recognition on the audio signal received from the external electronic device 210 having the greatest intensity of the audio signal in a position closest to the user, or perform speech recognition on all audio signals including the user speech (i.e., the audio signal received from the external electronic devices 210 and 220). However, this is merely exemplary, and is not limited thereto. For example, speech recognition may be performed on an audio signal having an audio signal intensity greater than or equal to a predetermined magnitude.

The electronic device 100 may perform speech recognition on the selected audio signal. Specifically, the electronic device 100 may perform speech recognition on the audio signal selected through the speech recognition engine stored in the electronic device 100. Here, the speech recognition engine may include an automatic speech recognition (ASR) engine for converting a user speech into text and a natural language understanding (NLU) engine for extracting meaning of the user utterance from a recognition result of the ASR engine. The electronic device 100 may include an ASR engine and an NLU engine for speech recognition.

As described above, the electronic device 100 may receive a speech command of a user existing at a remote distance by using the external electronic devices 210 to 240, and may provide a user with a service according to the speech of the user by recognizing the speech of the user.

Figure 2:
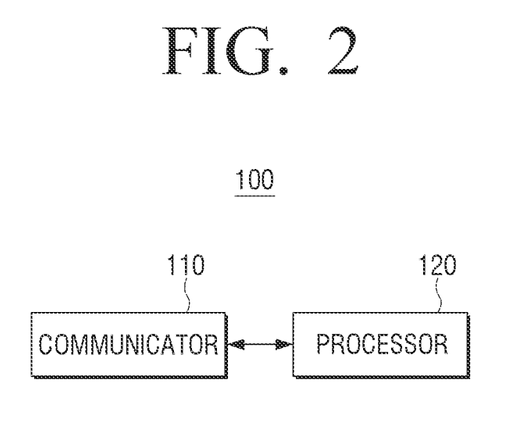
FIG. 2 is a block diagram illustrating a configuration of an electronic device according to an embodiment.

FIG. 2 is a block diagram illustrating a configuration of an electronic device according to an embodiment.

As illustrated in FIG. 2, the electronic device 100 may include a communicator 110 and a processor 120.

The communicator 110 may communicate with the external electronic devices 210 to 240. Accordingly, the communicator 110 may transmit and receive data to and from the external electronic devices 210 to 240.

The communicator 110 may transmit an audio signal to a server (not shown) to determine whether a song is included in the audio signal received from the external electronic devices 210 to 240, and in this case, the communicator 110 may communicate with a server (not shown).

When the speech recognition engine included in the electronic device 100 is implemented as a speech recognition server (not shown), the communicator 110 may communicate with a speech recognition server (not shown). In this case, the communicator 110 may transmit an audio signal including a user speech among the audio signals received from the external electronic devices 210 to 240 to a speech recognition server (not shown), and may receive data on a speech recognition result from a speech recognition server (not shown).

The communicator 110 may include various communication modules such as a wired communication module (not shown), a near field wireless communication module (not shown), a wireless communication module (not shown), or the like.

The wired communication module is a module for communicating with external electronic devices 210 to 240 and a server (not shown) according to a wired communication method, such as a wired Ethernet. The near field wireless communication module is a module for performing communication with external electronic devices 210 to 240 located in a near field according to a near field communication method such as Bluetooth (BT), Bluetooth Low Energy (BLE), and ZigBee. The wireless communication module is a module connected to an external network according to a wireless communication protocol such as an WiFi, IEEE, and the like, to communicate with external electronic devices 210 to 240 and a server (not shown). The wireless communication module may further include a mobile communication module for performing communication by accessing a mobile communication network according to various mobile communication standards such as a 3rd generation (3G), a 3rd generation partnership project (3GPP), a long term evolution (LTE), an LTE Advanced (LTE-A), $5^{th}$ Generation Networks (5G), or the like.

The communicator 110 may communicate with an electronic device (not shown), such as a TV, an air conditioner, or the like, as well as the external electronic devices 210 to 240 and a server (not shown). The communicator 110 may transmit speech recognition result data for user speech to an electronic device (not shown) using a wired communication module (not shown), a near field wireless communication module (not shown), and a wireless communication module (not shown).

The processor 120 is configured to control an overall operation of the electronic device 100 and a signal flow among internal components and process data. The processor 120 may control hardware or software components included in the electronic device 100, and may perform various data processing and operations. Further, the processor 120 may load and process commands or data received from at least one of the other components into the memory and store the various data in the non-volatile memory. The processor 120 may be implemented as an exclusive processor (e.g., an embedded processor) for performing a corresponding operation or a generic-purpose processor (e.g., a central processing unit (CPU) or an application processor) capable of performing the operations by executing one or more software programs stored in a memory device.

According to an embodiment, the processor 120 may receive, via the communicator 110, a plurality of audio signals obtained through a microphone by a plurality of external electronic devices 210 to 240 located at different places, and determine at least one audio signal including a user speech uttered by a user among the plurality of audio signals.

The processor 120 may identify an audio signal including a user speech and an audio signal not including a user speech among the audio signals received from the plurality of external electronic devices 210 to 240, and may determine an audio signal including a user speech according to a predetermined criterion. The audio signal that does not include the user speech may be an audio signal including ambient noise, music, or the like.

The processor 120 may determine an audio signal including a user speech uttered by a user among a plurality of audio signals based on a signal pattern of the plurality of audio signals.

The processor 120 may determine that the audio signal having a similar pattern among the plurality of audio signals received from the plurality of external electronic devices 210 to 240 is an audio signal including a speech uttered by the user. Here, the similar pattern may indicate that a frequency feature of the audio signal is similar for a predetermined time. The frequency feature may represent a period of frequency, a high or low frequency, a type a frequency, or the like, and may include all of the ranges that could be understood by a person skilled in the art.

For example, if the processor 120 selects an audio signal having the greatest intensity of the signal among the plurality of received audio signals, and if it is determined that the type of the frequency of the selected signal is similar for a predetermined time, the processor 120 may determine that the audio signal having a similar pattern is an audio signal including speech uttered by the user.

According to another embodiment, the processor 120 may determine an audio signal including user speech using the user's trigger utterance. The trigger utterance may refer to utterance before the user utters the speech command, and the processor 120 may determine that the sound signal including the trigger utterance through the trigger utterance is a signal including the user speech command.

For example, if the trigger utterance is "Hi, Bixby", that is, if the user utters a speech command (e.g., "please turn on TV") after uttering "Hi, Bixby", the processor 120 may identify a signal corresponding to the trigger utterance "Hi, Bixby", and then determine the sound signal that has occurred within a predetermined period of time as an audio signal including the user speech.

The processor 120 may determine that the audio signal having a same trigger utterance signal and a similar pattern, among a plurality of audio signals received from a plurality of external electronic devices 210 to 240, as an audio signal including a speech uttered by a user.

Figure 3:
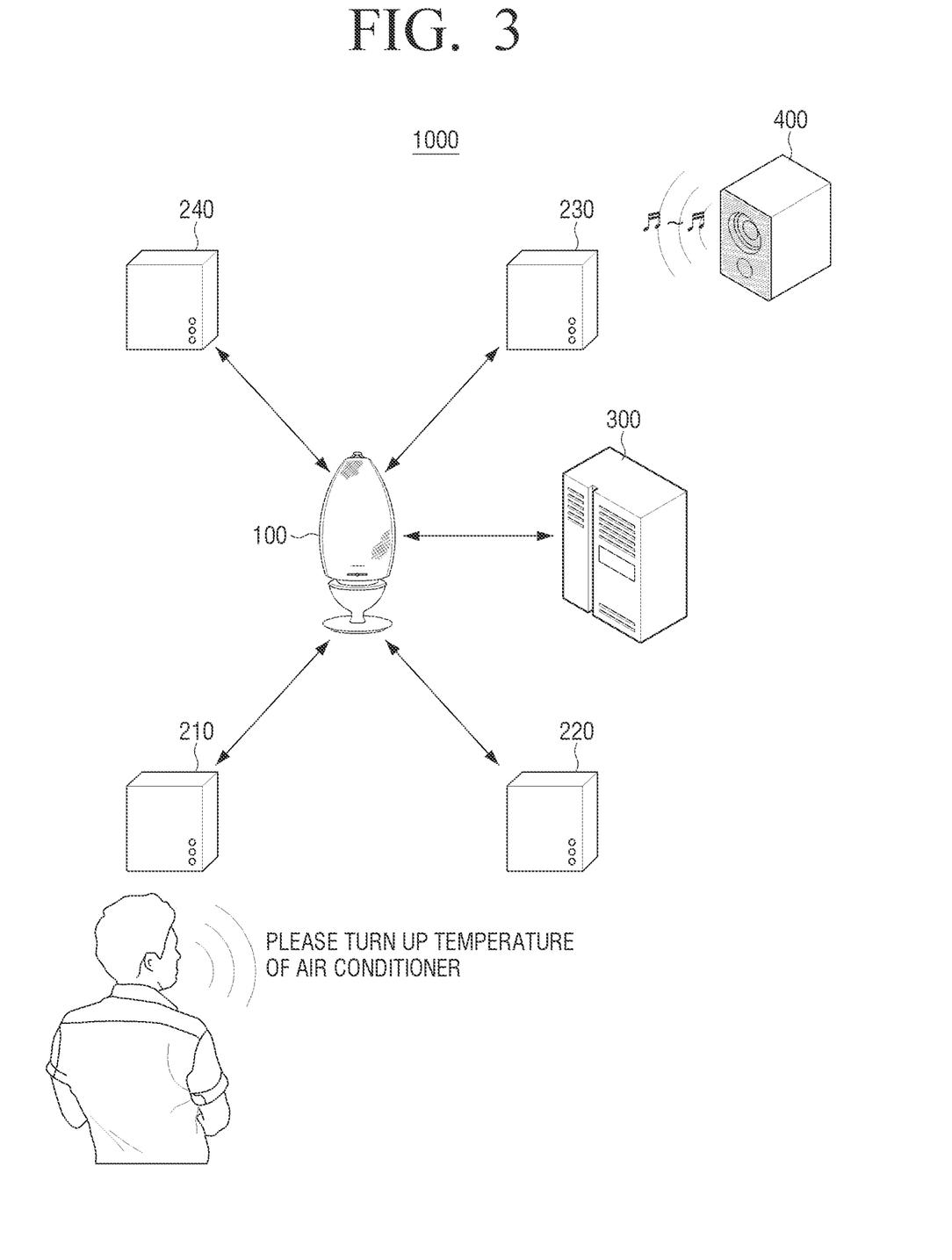
FIG. 3 is a diagram illustrating an electronic device according to an embodiment.

According to another embodiment, referring to FIG. 3, the processor 120 may determine an audio signal including a user speech using the external server 300.

FIG. 3 illustrates a case where a user utters a speech command in a space where the external electronic device 210 is located, and a song is reproduced from a speaker existing in a space where the external electronic device 230 is located, so that the processor 120 receives a sound signal including a user speech and a sound signal including a song from the external electronic device 210 and the external electronic device 230.

In this case, the processor 120 may transmit an audio signal having a predetermined size or greater, among the plurality of audio signals received from the plurality of external electronic devices 210 to 240, to the external server 300 through the communicator 110. In that the audio signal of less than a predetermined size is likely to be a noise, the processor 120 may transmit only an audio signal having a magnitude greater than or equal to a predetermined magnitude to the external server 300.

In the case of FIG. 3, the processor 120 may determine that the sound signal received from the external electronic device 210 (i.e., the sound signal including the user speech) and the sound signal received from the external electronic device 230 (i.e., the sound signal including the song) received from the external electronic device 210 may be determined as an audio signal having a predetermined size or more, and may transmit the signals to the external server 300.

The external server 300 may determine the sound signal received from the external electronic device 230 (that is, a sound signal including a song), among the sound signals received from the electronic device 100 as noise.

The external server 300 may determine whether a song is included in the sound signal by comparing the at least one received sound signal with the song information stored in the external server 300.

The external server 300 may transmit the determination result to the electronic device 100. Specifically, the external server 300 may transmit a determination result including whether a song is included in each of the audio signals received from the electronic device 100 to the electronic device 100.

Accordingly, the processor 120 may determine at least one audio signal including the user speech uttered by the user among the plurality of audio signals based on the information received from the external server 300.

The processor 120 may determine an audio signal received from the external electronic device 210 as an audio signal including a user speech, except the sound signal received from the external electronic device 230, which is a sound signal including a song among the audio signals received from the external electronic devices 210 and 230.

However, this is merely exemplary, and the external server 300 may determine a sound signal including the song and then may transmit, to the electronic device 100, the audio signal including the user speech or information thereabout. The external server 300 may transmit an audio signal including user speech to another server (e.g., a server including a speech recognition engine) (not shown).

Referring back to FIG. 2, the processor 120 may perform speech recognition for the audio signal which is determined to be the audio signal including the user speech.

The processor 120 may select at least one audio signal based on the intensity of the determined audio signal among the audio signals determined to be an audio signal including the user speech, and perform speech recognition on the selected audio signal.

As described above with reference to FIG. 1, the processor 120 may perform speech recognition on the audio signal having the greatest intensity among the determined audio signals, or perform speech recognition on the audio signal having an intensity greater than or equal to a predetermined magnitude. However, this is exemplary and the processor 120 may perform speech recognition on all the determined audio signals.

According to another embodiment, the processor 120 may remove noise included in the audio signal determined as an audio signal including the user speech and may perform speech recognition on the audio signal from which the noise is removed. Although the user speech is included in the audio signal received from the external electronic devices 210 to 240, noise (e.g., external noise, etc.) obtained with the user voice may be included. The processor 120 may remove noise included in the audio signal to increase the speech recognition rate.

For this purpose, the processor 120 may monitor the signal strength of each external electronic device 210 to 240 and may establish a noise determination criterion for external electronic devices 210 to 240, respectively. For example, if a sound of 10-15 dB is received from the external electronic device 210 and a sound of 20-22 dB is received from the external electronic device 220, the processor 120 may determine a sound of 8 dB or less included in the sound signal received from the external electronic device 210 as noise, and may determine a sound of 15 dB or less included in the sound signal received from the external electronic device 220 as noise. The processor 120 may differently set the noise determination criteria for the external electronic devices 210 to 240, respectively.

The processor 120 may receive a signal from which noise is removed based on a noise determination criterion set differently for external electronic devices 210 to 240, respectively. The processor 120 may receive a speech signal that is greater than a predetermined noise determination criterion in the sound signal received from the external electronic devices 210 to 240, respectively.

The processor 120 may remove noise included in the audio signal determined to be an audio signal including user speech using a filter. In order to remove noise, a noise removal filter used in a related-art speech recognition system may be used.

According to an embodiment, the processor 120 may remove noise using a matched filter. The processor 120 may use the matched filter to identify peaks of the received signal and remove noise around the peak. It would be obvious to a person skilled in the art to remove noise using a matched filter, and a detailed description thereof will be omitted.

According to another embodiment, the processor 120 may remove noise using a high pass filter. The processor 120 may use a high pass filter to pass a higher frequency than a predetermined frequency and filter low frequencies to remove noise. It would be obvious to a person skilled in the art to remove noise using a high pass filter, and thus a detailed description thereof will be omitted.

Figure 4:
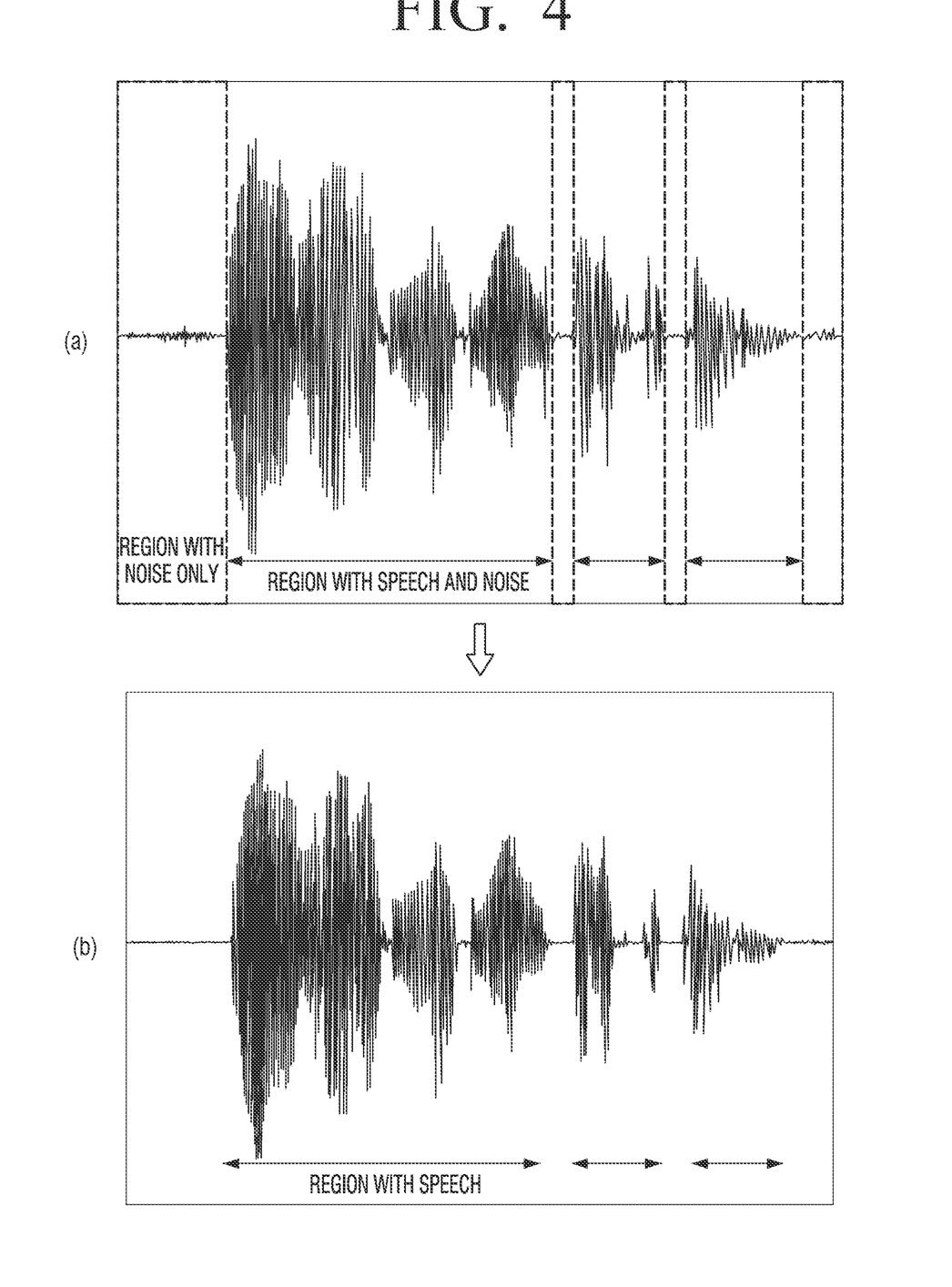
FIG. 4 illustrates a diagram of a speech signal including noise and speech according to an embodiment and a diagram illustrating a speech signal from which noise is removed according to an embodiment.

With respect to noise, in (a) of FIG. 4 is a diagram illustrating a speech signal including noise and speech according to an embodiment and in (b) of FIG. 4 is a diagram illustrating a speech signal from which noise is removed according to an embodiment.

As illustrated in in (a) of FIG. 4, based on a sound signal including a user speech and noise being input, the processor 120 may remove a signal included in a sound according to various embodiments as described above.

As illustrated in in (b) of FIG. 4, the processor 120 may generate a signal including only a user speech as a noise is removed.

The processor 120 may perform speech recognition for a sound signal including only a speech as noise is removed, and may increase a speech recognition rate for the user speech.

The processor 120 may perform speech recognition for the user speech using a speech recognition engine stored in a memory (not shown). To be specific, the processor 120 may include an automatic speech recognition (ASR) module and a natural language understanding (NLU) module.

The processor 120 may convert the user speech to text data using the automatic speech recognition module. For example, the ASR module may include the utterance recognition module. The utterance recognition module may include an acoustic model and a language model. For example, the acoustic model may include information related to vocalization, and the language model may include information on unit phoneme information and a combination of unit phoneme information. The utterance recognition module may convert the user utterance into text data using the information related to speech and information on the unit phoneme information.

The processor 120 may perform syntactic analysis or semantic analysis on the user speech by using the natural language understanding module to grasp the user intent. In syntactic analysis, a user input may be divided into grammatical units (e.g., words, phrases, morphemes, etc.), and it may be grasped whether the divided units have any grammatical element. Semantic analysis may be performed using semantic matching, rule matching, formula matching, or the like. Accordingly, the natural language understanding module 320 may obtain parameters (or slots) necessary to represent any domain, intent, or intent. For example, the one domain (e.g., an air conditioner) may include a plurality of intents (e.g., air conditioner ON, air conditioner temperature control, air conditioner wind direction adjustment, etc.), and one intent may include a plurality of parameters (e.g., temperature, time, etc.). The plurality of rules may include, for example, one or more essential element parameters. The matching rules may be stored in a natural language understanding database (NLU DB).

The natural language understanding module may grasp the meaning of a word extracted from a user query using linguistic features such as morpheme, phrase, and the like (e.g., grammatical elements), and may match the grasped meaning of the word with the domain and intent to determine the intent of the user. For example, the natural language understanding module may determine how many words extracted from the user query are included in each domain and intent to determine the user intent. According to one embodiment, the natural language understanding module may determine a parameter of the user input using a word which is a basis for grasping the intent.

The processor 120 may perform speech recognition for the sound signal including the user speech and may provide a service according to the speech recognition result.

Figure 5:
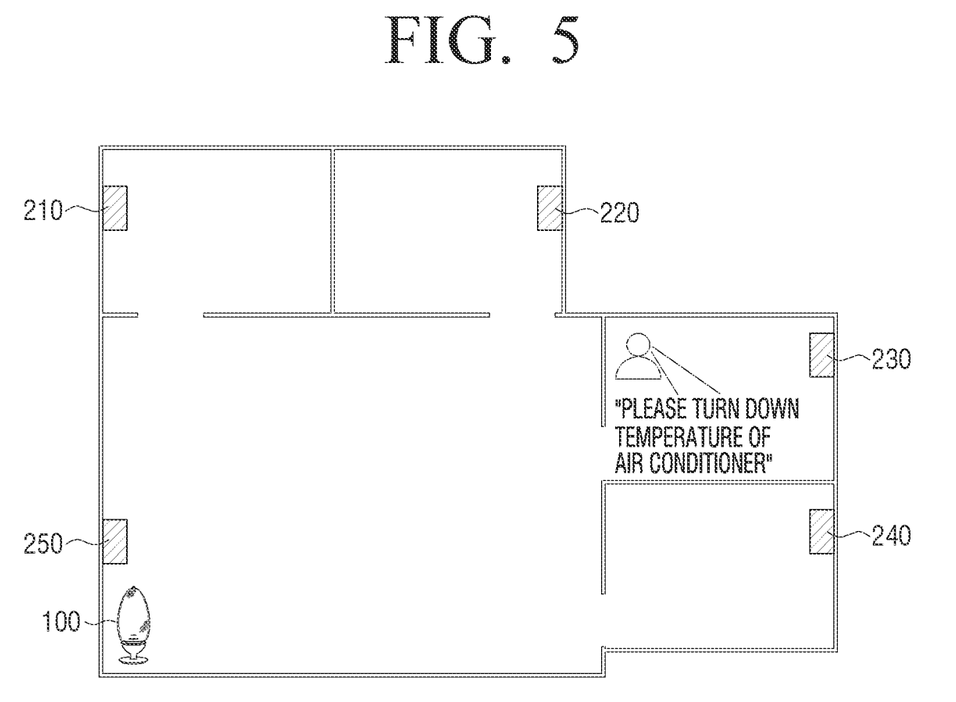
FIG. 5 is a diagram illustrating an electronic device according to an embodiment.

FIG. 5 is a diagram illustrating an electronic device according to an embodiment. To be specific, FIG. 5 is a diagram illustrating an electronic device to provide a service according to a speech recognition result.

After the speech recognition for the user speech included in the sound signal is completed, the processor 120 may determine the location of the user and may provide a service according to the speech recognition result.

The processor 120 may determine a location of the user based on a location of an external electronic device which transmits an audio signal in which speech recognition is performed among a plurality of external electronic devices 210 to 250.

As described above with reference to FIG. 2, the processor 120 may determine that a user is located in a place where the external electronic device transmitting the audio signal in which the speech recognition is performed is located, in that the audio signal having the largest signal intensity, among the plurality of received audio signals, is selected.

For example, as shown in FIG. 5, if the processor 120 performs speech recognition on the audio signal received from the external electronic device 230 through the process described above in FIGS. 2 to 4, the processor 120 may determine that the intensity of the audio signal transmitted by the external electronic device 230 among the plurality of received audio signals is highest and the user is likely to be located around the external electronic device 230.

Accordingly, the processor 120 may determine that the user is located around the external electronic device that has transmitted the audio signal in which the speech recognition has been performed, and may provide a service according to the speech recognition result on the basis of the determined location of the user.

For example, according to the process of FIGS. 2 to 4, the processor 120 may receive a plurality of audio signals from a plurality of external devices 210 to 250, determine an audio signal (e.g., an audio signal received from the external electronic device 220 and the external electronic device 230) including a user speech among the received audio signals, and select an audio signal received from the external electronic device 230 as an audio signal for speech recognition based on the signal intensity of the determined audio signal. The processor 120 may perform speech recognition on the selected audio signal, and may determine that the intent of the user's utterance "please turn down the temperature of an air conditioner" is to lower the set temperature of the air conditioner.

The processor 120 may determine that the audio signal for which speech recognition has been performed is transmitted from the external electronic device 230, and may identify that the user is located around the external electronic device 230.

The processor 120 may provide a service according to a speech recognition result based on the determined user location. Here, the service indicates that an external device (not shown) connected to the electronic device 100 performs an operation according to a speech recognition result. The external device (not shown) may be an electronic device such as a TV (not shown), a washing machine (not shown), an air conditioner (not shown), a fan (not shown), a refrigerator (not shown), a heating device (not shown), or the like.

For example, if the speech recognition result is determined to lower the temperature of the air conditioner, the processor 120 may transmit a signal including a command to lower the temperature of the air conditioner to the air conditioner (not shown). An air conditioner (not shown) receiving a signal from the processor 120 may perform an operation of lowering the temperature of the air conditioner according to a command included in the signal.

This is exemplary, and the processor 120 may transmit a speech recognition result directly to the air conditioner (not shown) instead of the signal including the command. In this case, the air conditioner (not shown) may control the operation of the air conditioner (not shown) according to the speech recognition result.

In that the processor 120 provides a service according to the speech recognition result based on the user's location, the processor 120 may provide a service only to a location which is determined that the user is present.

For example, if the processor 120 determines that the user is located around the external electronic device 230, the processor 120 may allow only the temperature of the air conditioner in the space where the user exists (i.e., the space in which the external electronic device 230 is installed) to be lowered, except the space in which the external electronic devices 210, 220, 240, and 250 are installed.

The processor 120 may provide a service corresponding to the speech recognition result of the user in consideration of the location of the user.

Figure 6:
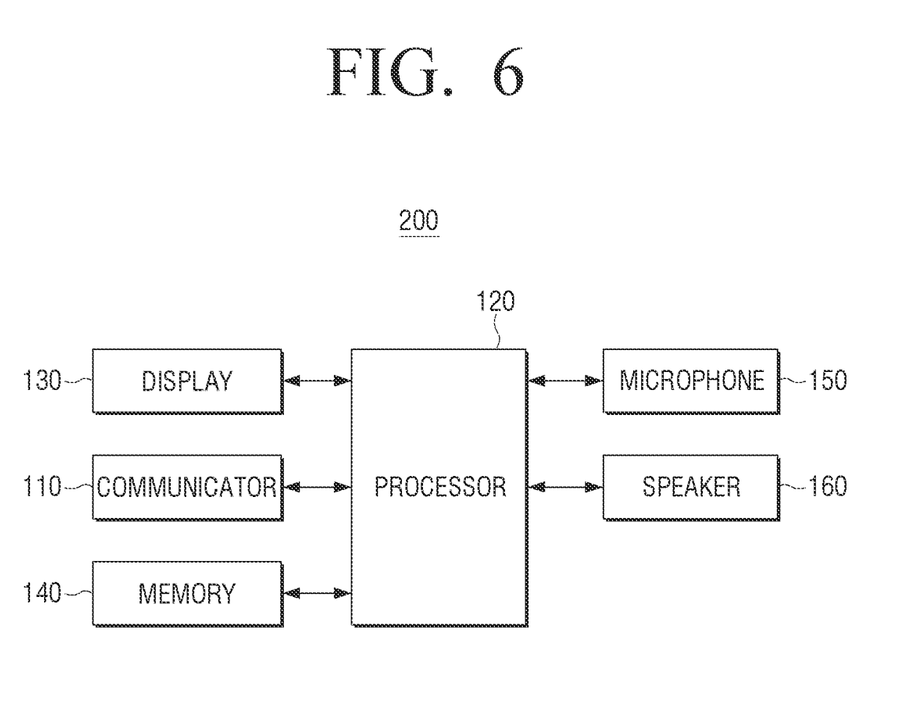
FIG. 6 is a block diagram illustrating a configuration of an electronic device in detail according to an embodiment.

FIG. 6 is a block diagram illustrating a configuration of an electronic device in detail according to an embodiment.

As illustrated in FIG. 6, the electronic device 100 may include the communicator 110, the processor 120, a display 130, a memory 140, a microphone 150, and a speaker 160. The communicator 110 and the processor 120 have been described with reference to FIG. 2 and will not be further described.

The display 130 may display various information according to the control of the processor 120. The display 130 may display a user interface (UI) of various applications executed in the electronic device 100.

The display 130 may display various information such as whether the electronic device 100 is receiving a user speech signal from the external electronic devices 210 to 240, determined location information of the user, information such as a speech recognition result, or the like.

The memory 140 may store an instruction or data related to at least one another element of the electronic device 100. The memory 140 may be a non-volatile memory, a volatile memory, a flash memory, a hard disk drive (HDD), a solid state drive (SSD), or the like. The memory 140 may be accessed by the processor 120, and read/write/modify/update data by the processor 120 may be performed.

In the disclosure, the term memory may include the memory 140, read-only memory (ROM) in the processor 120, random access memory (RAM), or a memory card (for example, a micro secure digital (SD) card, and a memory stick) mounted to the electronic device 100. The memory 140 may store a program and data, or the like, to configure various screens to be displayed on a display region of the display.

As described above, the memory 140 may store at least one instruction. The instruction may be an instruction to control the electronic device 100 and may control an operation of an application executed in the electronic device 100.

The memory 140 may store a speech recognition engine to recognize a user speech included in the audio signal received from the external electronic devices 210 to 240.

The memory 140 may store the speech recognition engine including an automatic speech recognition engine and a natural language understanding module. The ASR and NLU have been described with reference to FIG. 2 and will not be further described.

The microphone 150 is an element to receive a user speech by the electronic device 100. The microphone 150 may receive external user speech using a microphone and may process the user speech to electric speech data. In this case, the microphone 150 may transmit the processed speech data to the processor 120.

The speaker 160 is a configuration to output not only various audio data processed, by the audio processor, as decoding, amplification, and noise filtering but also various notification sounds or speech message. The speaker 160 may output a response to the user's query as a speech message in a natural language format. The configuration to output audio may be implemented as a speaker, but this is an example and may be implemented as an output terminal for outputting audio data.

The configuration of FIG. 6 is merely exemplary and at least a part of the elements of the electronic device 100 of FIG. 6 may be omitted according to an embodiment of the electronic device 100. For example, the electronic device 100 may be connected to an external electronic device (not shown) including a microphone, instead of including the microphone 150, and may receive a user speech signal received by the external electronic device (not shown).

Figure 7:
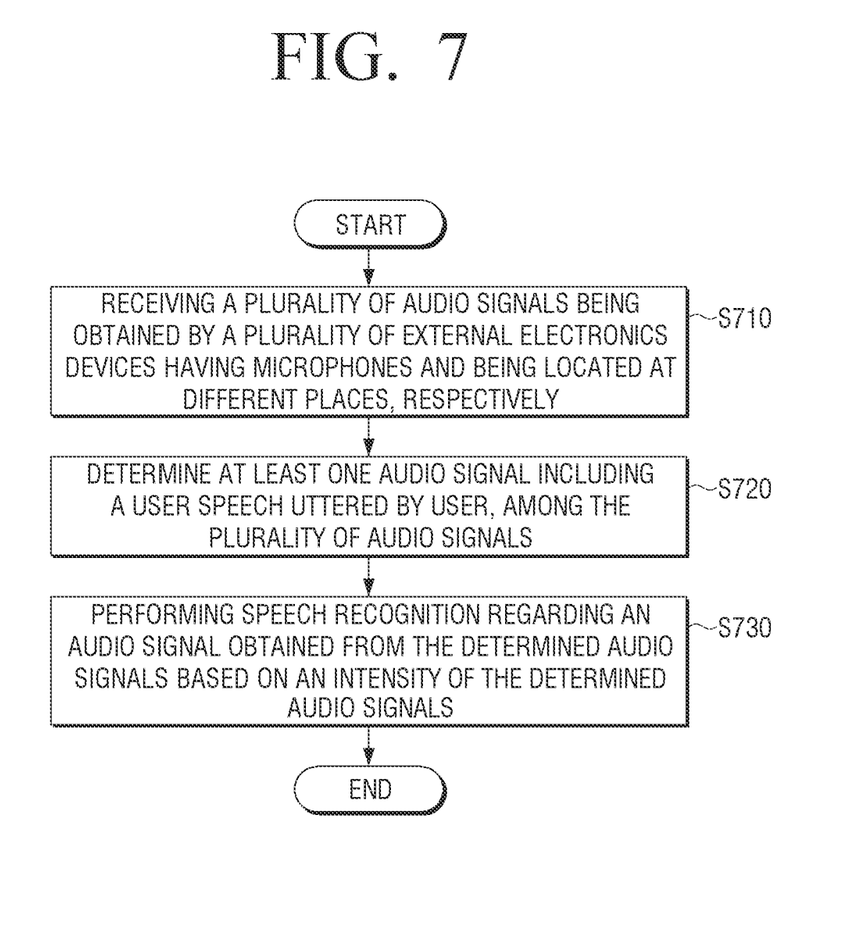
FIG. 7 is a flowchart illustrating a method for controlling an electronic device according to an embodiment.

FIG. 7 is a flowchart illustrating a method for controlling an electronic device according to an embodiment.

A plurality of audio signals, the plurality of audio signals being obtained by a plurality of external electronic devices having microphones, respectively, and which are located at different places, via microphones, are received in operation S710.

The plurality of external electronic devices may be electronic devices which may convert an external energy into an electrical energy through energy harvesting and may supply power to the plurality of external electronic devices using the electrical energy.

At least one audio signal including a user speech uttered by a user, among the plurality of audio signals, may be determined in operation S720.

At least one audio signal including a user speech uttered by the user, from among the plurality of audio signals, may be determined based on a signal pattern of the plurality of audio signals.

An audio signal having similar signal patterns, among the plurality of audio signals, may be determined as an audio signal including a user speech uttered by the user.

An audio signal that is greater than or equal to a preset magnitude, among the plurality of audio signals, may be transmitted to an external server and at least one audio signal including a user speech uttered by the user among the plurality of audio signals may be determined based on the information received from the external server.

Thereafter, speech recognition for the audio signal obtained based on the intensity of the determined audio signal, among the determined audio signals, may be performed in operation S730.

The speech recognition for an audio signal having greatest intensity among the determined audio may be performed.

The noise from an audio signal obtained based on the intensity of the determined audio signal may be removed and speech recognition for the audio signal from which the noise is removed may be performed.

After speech recognition is performed, a location of the user may be determined based on a location of an external electronic device which transmits an audio signal for which the speech recognition is performed among the plurality of external electronic devices.

A service according to the speech recognition result may be provided based on the determined location of the user.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

Various embodiments may be implemented as software that includes instructions stored in machine-readable storage media readable by a machine (e.g., a computer). A device may call instructions from a storage medium and operate in accordance with the called instructions, including an electronic device (e.g., electronic device 100). When the instruction is executed by a processor, the processor may perform the function corresponding to the instruction, either directly or under the control of the processor, using other components. The instructions may include a code generated by a compiler or a code executable by an interpreter. The machine-readable storage medium may be provided in the form of a non-transitory storage medium. The "non-transitory" storage medium may not include a signal and is tangible, but does not distinguish whether data is permanently or temporarily stored in a storage medium.

The methods according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

The respective elements (e.g., module or program) mentioned above may include a single entity or a plurality of entities. At least one element or operation from of the corresponding elements mentioned above may be omitted, or at least one other element or operation may be added. Alternatively or additionally, components (e.g., module or program) may be combined to form a single entity. In this configuration, the integrated entity may perform functions of at least one function of an element of each of the plurality of elements in the same manner as or in a similar manner to that performed by the corresponding element from of the plurality of elements before integration. The module, a program module, or operations executed by other elements according to embodiments may be executed consecutively, in parallel, repeatedly, or heuristically, or at least some operations may be executed according to a different order, may be omitted, or the other operation may be added thereto.

What is claimed is:

1. An electronic device comprising:
    a communicator; and
    a processor configured to:
        control the communicator to receive a plurality of audio signals being obtained by a plurality of external electronic devices having microphones and being located at different place, respectively,
        determine at least one audio signal including a user speech uttered by a user, among the plurality of audio signals based on an intensity of the plurality of audio signals,
        perform speech recognition regarding an audio signal obtained from the determined audio signals,
        determine a location of the user based on a location of an external electronic device which transmits an audio signal for which the speech recognition is performed among the plurality of external electronic devices, and
        provide a service according to the speech recognition based on the determined location of the user.

2. The electronic device of claim 1, wherein the processor is further configured to determine at least one audio signal including a user speech uttered by the user, from among the plurality of audio signals, based on a signal pattern of the plurality of audio signals.

3. The electronic device of claim 2, wherein the processor is further configured to determine an audio signal having similar signal patterns, among the plurality of audio signals, as an audio signal including a user speech uttered by the user.

4. The electronic device of claim 1, wherein the processor is further configured to:
    transmit, to an external server through the communicator, an audio signal that is greater than or equal to a preset magnitude, among the plurality of audio signals, and determine at least one audio signal including a user speech uttered by the user among the plurality of audio signals based on information received from the external server.

5. The electronic device of claim 1, wherein the processor is further configured to perform speech recognition regarding an audio signal having greatest intensity among the determined audio signals.

6. The electronic device of claim 1, wherein the processor is further configured to remove noise from an audio signal obtained based on the intensity of the determined audio signal and perform speech recognition for the audio signal from which the noise is removed.

7. The electronic device of claim 1, wherein the plurality of external electronic devices convert an external energy into an electrical energy through energy harvesting and supply power to the plurality of external electronic devices using the electrical energy.

8. A method for controlling an electronic device, the method comprising:
    receiving a plurality of audio signals being obtained by a plurality of external electronic devices having microphones and being located at different places, respectively;
    determining at least one audio signal including a user speech uttered by a user, among the plurality of audio signals based on an intensity of the plurality of audio signals;
    performing speech recognition regarding an audio signal obtained from the determined audio signals;
    determining a location of the user based on a location of an external electronic device which transmits an audio signal for which the speech recognition is performed among the plurality of external electronic devices; and
    providing a service according to the speech recognition based on the determined location of the user.

9. The method of claim 8, wherein the determining the audio signal comprises determining at least one audio signal including a user speech uttered by the user, from among the plurality of audio signals, based on a signal pattern of the plurality of audio signals.

10. The method of claim 9, wherein the determining the audio signal comprises determining an audio signal having similar signal patterns, among the plurality of audio signals, as an audio signal including a user speech uttered by the user.

11. The method of claim 8, wherein the determining the audio signal comprises:
- transmitting, to an external server, an audio signal that is greater than or equal to a preset magnitude, among the plurality of audio signals; and
- determining at least one audio signal including a user speech uttered by the user among the plurality of audio signals based on information received from the external server.

12. The method of claim 8, wherein the performing the speech recognition comprises performing speech recognition for an audio signal having greatest intensity among the determined audio.

13. The method of claim 8, wherein the performing the speech recognition comprises:
- removing noise from an audio signal obtained based on the intensity of the determined audio signal; and
- performing speech recognition for the audio signal from which the noise is removed.

\* \* \* \* \*